United States Patent [19]

Nakai et al.

[11] Patent Number: 4,597,786
[45] Date of Patent: Jul. 1, 1986

[54] PURIFYING PROCESS OF FLUORIDE GLASS

[75] Inventors: Tetsuya Nakai, Kanagawa; Yoshinori Mimura, Saitama; Osamu Shinbori, Tokyo; Hideharu Tokiwa, Saitama, all of Japan

[73] Assignee: Kokusai Denshin Denwa Co., Ltd., Tokyo, Japan

[21] Appl. No.: 767,394

[22] Filed: Aug. 19, 1985

[30] Foreign Application Priority Data

Sep. 4, 1984 [JP] Japan ................................ 59-183752

[51] Int. Cl.$^4$ ............................................ C03C 3/12
[52] U.S. Cl. ........................................ 65/2; 65/134; 65/DIG. 16; 501/30; 501/40
[58] Field of Search ...................... 65/2, 134, DIG. 16; 501/30, 40

[56] References Cited

U.S. PATENT DOCUMENTS

| 4,264,347 | 4/1981 | Shintani et al. | 65/DIG. 16 |
| 4,539,033 | 9/1985 | Beales et al. | 65/DIG. 16 |
| 4,560,667 | 12/1985 | Lucas et al. | 65/2 |

FOREIGN PATENT DOCUMENTS

| 0145031 | 6/1985 | European Pat. Off. | 65/2 |
| 2726170 | 6/1976 | Fed. Rep. of Germany | 501/40 |

Primary Examiner—Arthur Kellogg
Attorney, Agent, or Firm—Armstrong, Nikaido, Marmelstein & Kubovcik

[57] ABSTRACT

A fluoride glass for infrared optical transmission fiber is purified for dehydration and deoxidation to reduce transmission loss by reacting melted fluoride glass with $NF_3$ gas at temperature between 500° C. and 800° C. No scattering loss is increased by the present purification as decomposed product in the reaction does not precipitate.

9 Claims, 1 Drawing Figure

PURIFYING PROCESS OF FLUORIDE GLASS

BACKGROUND OF THE INVENTION

The present invention relates to purifying method of fluoride glass which is used for an optical fiber, in particular, relates to purifying method of $ZrF_4$ based and/or $H_fF_4$ based fluoride glass.

It is theoretically analyzed that a fluoride glass optical fiber, in particular, $ZrF_4$ based and/or $H_fF_4$ based fluoride glass optical fiber allows infrared transmission (2–4 μm wavelength) with an extremely small loss of less than 0.1 dB/km, which is less than that of a conventional silica based optical fiber. Therefore, a fluoride glass optical fiber is very promising for a future optical fiber.

The problem to be solved in a conventional fluoride optical fiber is the light absorption around 3 μm wavelength by molecule vibration of hydroxyl group (OH) which is included in fluoride glass.

Conventionally, a fluoride glass has been dehydrated as the same manner as that of a silica based glass. That is to say, a fluoride glass is first melted in atmosphere of halogen gas (for instance, $Cl_2$, $CCl_4$, $SF_6$ et al) so that the dehydration is accomplished by chemical reaction between hydroxyl group included in fluoride glass and halogen gas. Although that prior dehydration process is also effective to dehydrate fluoride glass, it has the serious disadvantage that the transmission loss of the glass increases considerably by scattering. Accordingly, the chemical dehydration is not used at present, instead, a glass is manufactured in dried gas atmosphere so that a glass does not include water in producing process.

The concentration of hydroxyl group (OH) must be less than 1 ppm, or less for a small loss optical fiber. However, a prior producing method which manufactures glass in dried atmosphere can not exclude water and/or hydroxyl group to that value. Further, as mentioned above, a prior chemical process has the disavantage that a scattering loss is increased.

Thus, no effective dehydration process for fluoride glass has not been proposed.

SUMMARY OF THE INVENTION

It is an object, therefore, of the present invention to provide a purification process for fluoride glass by overcoming the disadvantages of the prior arts.

It is also an object of the present invention to provide a dehydration process for fluoride glass so that the concentration of hydroxyl group (OH) is less than 1 ppm, and no scattering loss is increased.

The above and other objects of the present invention are attained by purifying process for dehydration and deoxidation of fluoride glass having the step of heating fluoride glass to temperature between 500° C. and 800° C. to melt the glass in atmosphere of fluoride nitrogen ($NF_3$) to react radical fluorine gas dissociated from $NF_3$ with hydroxyl group (OH) and oxide included in the fluoride glass.

BRIEF DESCRIPTION OF THE DRAWINGS

The foregoing and other objects, features, and attendant advantages of the present invention will be appreciated as the same become better understood by means of the following description and accompanying drawing, wherein.

DESCRIPTION OF THE PREFERRED EMBODIMENTS

Figure 1:
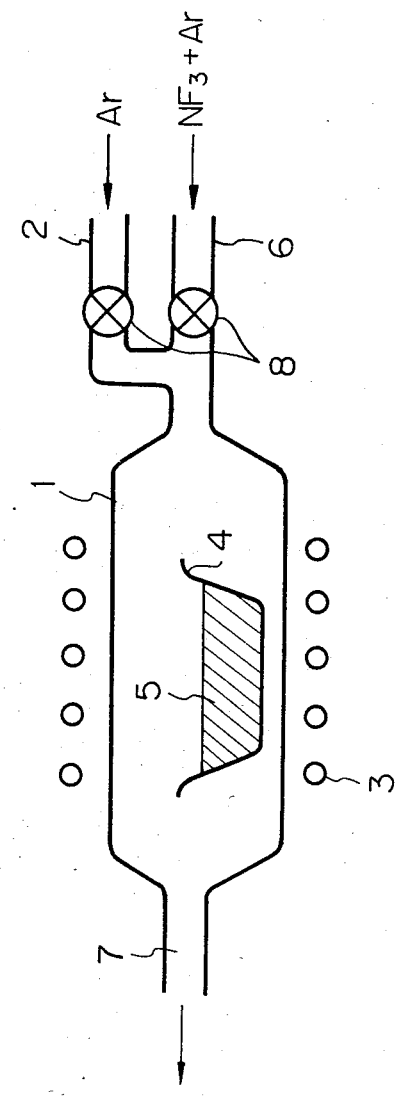
FIG. 1 is the apparatus for purifying fluoride glass used in the present invention.

As mentioned above, the prior dehydration process by using halogenide gas like $Cl_2$ is effective for silica based optical fiber to provide hydroxyl group (OH) less than 1 ppm, however, the prior chemical process is useless for fluoride glass since it increases scattering loss. Therefore, the conventional chemical process should be improved to solve the above problem for fluoride glass.

First, we analyzed the reason why the scattering loss is increased when the chemical process is carried out for fluoride glass, and we found that the dehydration process for $ZrF_4$ based fluoride glass is accomplished according to the chemical reaction shown in the chemical equation (1).

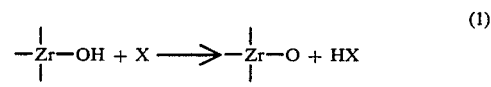

$$-\overset{|}{\underset{|}{Zr}}-OH + X \longrightarrow -\overset{|}{\underset{|}{Zr}}-O + HX \quad (1)$$

In a $ZrF_4$ based fluoride glass, a hydroxyl group (OH) is coupled with Zr to provide a hydroxide. When halogenide gas or radical (or nascent) halogen atom dissociated from halogenide gas reacts with hydroxyl group, hydrogen halogenide is generated, and hydroxyl group of Zr changes to oxide of Zr (final product is $ZrO_2$). With this chemical reaction, hydroxyl group in fluoride glass is decreased, however, oxide of Zr increases in the fluoride glass. As oxide of Zr does not melt in melted glass, but precipitates as corpuscle in the melt. That corpuscle generates scattering loss.

Another reason for increasing scattering loss is precipitation of C and/or S corpuscle which is generated by dissociation of $CCl_4$ or $SF_6$.

Accordingly, when fluoride glass is dehydrated chemically, the mere removal of hydroxyl group (OH) in insufficient, although it is enough for dehydration for silica glass. That is to say, in case of fluoride glass, not only dehydration of hydroxyl group (OH), but also the removal of oxide must be accomplished. Further, $CCl_4$ or $SF_6$ which generates corpuscle production in the glass melt is not suitable for dehydration of fluoride glass.

Next, we also analyzed why $Cl_2$ gas which is effective for silica glass, is not effective for fluoride glass. And, we found that the temperature in dehydration process is important factor for dehydration effect. In other words, in case of $Cl_2$ gas, what is effective to dehydration is not $Cl_2$ gas itself, but radical chloride (Cl) atom dissociated from $Cl_2$ gas. As the amount of radical chloride atom is increased in high temperature, chloride gas ($Cl_2$) is effective for silica glass which reacts at high temperature (1300° C.–1500° C.). However, in case of fluoride glass, the dehydration temperature must be in the range between 450° C. and 800° C., since the melting point of fluoride glass is only 450° C., and $ZrF_4$ is sublimated at temperature higher than 800° C. However, chloride gas ($Cl_2$) is not dissociated enough at that temperature for providing sufficient radical chloride atom which is reactive for dehydration.

Accordingly, the gas for dehydration of fluoride gas must have large dissociation at relatively low temperature in the range 450° C. and 800° C.

Accordingly, the gas must satisfy the following conditions for providing enough dehydration effect and no increase of scattering loss.

(1) Both dissociation of hydroxyl group (OH), and fluoride reaction of oxide must be accomplished.

(2) No residual corpuscule exists in the glass melt as impurity by dissociation of reaction gas.

(3) It has strong chemical reaction at the temperature between 450° C. and 800° C.

In searching various halogen gas and halogenide gas, we found that chloride group gas like $Cl_2$ and $CCl_4$ is not suitable, because it is not capable of removing oxide. On the other hand, fluorine group gas is capable of removing oxide, but $CF_4$, $BF_4$, and $SF_6$ are still not suitable because the dissociated corpuscule is precipitated in the glass solution.

Finally, we found that $F_2$ gas and $NF_3$ gas satisfy the above three conditions. Among them, however, $F_2$ gas is not still suitable because $F_2$ gas has strong corrosive action to corride a reaction tube and/or a crucible, and further, it has too strong poison. On the other hand, $NF_3$ gas is inactive at room temperature and is not poisonous. Further, $NF_3$ gas dissociates fluorine gas with radical fluorine atom at temperature higher than 500° C., and therefore, $NF_3$ gas has strong dehydration effect and strong deoxidation effect at relatively low temperature between 500° C. and 800° C. Further, when $NF_3$ gas is dissociated, no precipitate resides in the glass melt, since the dissociated gas $N_2$ from $NF_3$ gas is dispersed in the space.

Further, it should be appreciated that the present purification is effective not only for dehydration of OH ion, but also complex ion like $CO_3^-$, $NO_3^-$, $COOH^-$, $SO_4^{--}$, and $NH_4^-$. A prior method for removing those complex ions is to melt glass at high temperature higher than 800° C. for a long time to carry out the following chemical equation.

$$M^{2+}CO_3^{2-} \text{(high temperature)} \rightarrow MO + CO_2 \uparrow \qquad (2)$$

or $$M^+NO_3^- \text{(high temperature)} \rightarrow M_2O + NO_2 \uparrow + NO_3 \uparrow \qquad (3)$$

where M is metal included in fluoride glass. Although complex ions disappear according to the formula (2) or (3), it has the disadvantage that some oxide (MO, $M_2O$) is generated by dissociation of $CO_3^{2-}$, and/or $NO_3^-$.

On the other hand, the chemical equation according to the present invention which uses $NF_3$ gas is as follows.

$$M^{2+}CO_3^{2-} + 2F \rightarrow MF_2 + CO_2 \uparrow + \tfrac{1}{2}O_2 \uparrow \qquad (4)$$

or $$M^+NO_3^- + F \rightarrow MF + NO_2 \uparrow + \tfrac{1}{2}O_2 \uparrow \qquad (5)$$

It should be noted in the equations (4) and (5) that the present invention does not generate oxide which increases scattering loss. Thus, the $NF_3$ gas according to the present invention removes complex ions without increasing scattering loss.

EXPERIMENT

FIG. 1 shows an apparatus for carrying out the present invention. In the FIGURE, the numeral 1 is a reaction chamber, 2 is an inlet of an inert gas like Ar gas, 3 is a radio frequency coil for heating, 4 is a carbon crucible, 5 is fluoride glass which is subject to purification process, 6 is an inlet of mix gas of $NF_3 + Ar$, 7 is an outlet of exhaust gas, and 8 is a stop valve.

First, Ar (Argon) gas is introduced into the reaction chamber 1 through the inlet 2. After the reaction chamber 1 is filled with dried Argon gas, the radio frequency coil 3 is energized to heat the crucible 4 at about 800° C. to melt the fluoride glass 5. The composition of fluoride glass is (mol%);

$$53ZrF_4 - 20BaF_2 - 20NaF - 4LaF_3 - 3AlF_3$$

After at least 30 minutes of melting, the temperature of the crucible 4 is decreased to about 700° C., and the mix gas of 10% $NF_3$ + 90% Ar (mol%) is flown by 3 liter/minute for at least 30 minutes. Then, the melted glass is cooled with the cool speed of about 30° C./minute to provide a glass block.

It should be noted that the concentration of $NF_3$ gas is not restricted to 10%, but is possible between 1% and 10%, and Ar gas may be replaced by any inert gas.

We tested the glass block thus obtained by infrared absorption spectrum, and found no absorption peak of hydroxyl group (OH) exists. Further, we tested the scattering of that glass block by using He-Ne laser, and found that the Rayleigh ratio of that glass block is $8 \times 10^{-7}$, which is less than that of raw glass before dehydration process. The Rayleigh ratio of raw glass block is $9 \times 10^{-7}$.

Therefore, it is clear that $NF_3$ gas is effective for purifying fluoride glass.

We also experimented to prove the effectness of the present invention. That is to say, we prepared fluoride glass which includes surplus hydroxyl group and/or water, purposely. In this experiment, we introduced wet Argon gas which passed in the water, into the reaction chamber 1, then, we heated the glass up to 800° C. to melt the same for 30 minutes so that the melted glass includes surplus water steam. Next, the temperature of the crucible 4 is decreased to 700° C., and the mixed gas of 10%$NF_3$+90%Ar is flown by the rate of 3 liter/minute for 30 minutes, and finally, the specimen is cooled with the cool speed of 30° C./minute. In testing the absorption spectrum of the glass block thus obtained, no peak of hydroxyl group (OH) is found. Further, the Rayleigh ratio of that glass block is $9 \times 10^{-7}$, which is almost the same as the glass before dehydration process. The second experiment shows that the present purification process is extremely effective to purify fluoride glass.

It should be appreciated that the present invention is applicable not only to $ZrF_4$ glass but also $H_fF_4$ glass, although the above experiments show only $ZrF_4$ glass, since $H_fF_4$ glass has the similar chemical nature to that of $ZrF_4$ glass.

As mentioned above, according to the present invention, the purification is accomplished at relatively low temperature between 500° C. and 800° C., has excellent deoxidation effect, and no dissociated corpuscule is generated. Therefore, the present invention is advantageous for purifying in particular fluoride glass optical fiber, and the present invention provides the dehydration and deoxidation without increasing scattering loss.

From the foregoing, it will now be apparent that a new and improved purification process for fluoride glass has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A purifying process for dehydration and deoxidation of fluoride glass comprising the step of heating fluoride glass to temperature between 500° C. and 800° C. to melt the glass in atmosphere of fluoride nitrogen ($NF_3$) to react radical fluorine atom dissociated from $NF_3$ with hydroxyl group, complex ion and oxide included in the fluoride glass.

2. A purifying process for dehydration and deoxidation of fluoride glass comprising the steps of;

heating fluoride glass around 800° C. for at least 30 minutes to melt that fluoride glass, decreasing the temperature to around 700° C., flowing gas including $NF_3$ on melted fluoride glass by rate of about 3 liter/minute for at least 30 minutes, and cooling the fluoride glass by rate of about 30° C./minutes.

3. A purifying process according to claim 1, wherein said gas including $NF_3$ is mixture of $NF_3$ and inert gas with mol-ratio of $NF_3$ between 1% and 10%.

4. A purifying process according to claim 1, wherein said gas including $NF_3$ is 10%$NF_3$+90%Ar (mol%).

5. A purifying process according to claim 1, wherein said fluoride glass system is;

$ZrF_4$—$BaF_2$—NaF—$LaF_3$—$AlF_3$.

6. A purifying process according to claim 1, wherein said fluoride glass is $H_fH_4$ group glass.

7. A purifying process according to claim 1, wherein said fluoride glass is used as an optical transmission fiber.

8. A purifying process according to claim 1, wherein fluoride glass which is subject to purification is pre-dried by flowing dry Ar gas on the glass.

9. A purifying process according to claim 1, wherein said complex ion includes at least one of $NH_4^+$, $SO_4^{--}$, $COOH^-$, $CO_3^-$, and $NO_3^-$.

* * * * *